(12) United States Patent
Lindqvist et al.

(10) Patent No.: US 8,896,313 B2
(45) Date of Patent: Nov. 25, 2014

(54) ELECTROMAGNETIC RECEIVER ASSEMBLY FOR MARINE ELECTROMAGNETIC SURVEYING

(75) Inventors: Ulf Peter Lindqvist, Segltorp (SE); Gustav Goran Mattias Sudow, Solna (SE); Andras Robert Juhasz, Stockholm (SE); Rune Johan Magnus Mattsson, Trangsund (SE); Carl Joel Gustav Skogman, Jarfalla (SE); Lars Erik Magnus Bjornemo, Knivsta (SE)

(73) Assignee: PGS Geophyiscal AS, Oslo (NO)

( * ) Notice: Subject to any disclaimer, the term of this patent is extended or adjusted under 35 U.S.C. 154(b) by 297 days.

(21) Appl. No.: 13/421,683

(22) Filed: Mar. 15, 2012

(65) Prior Publication Data
US 2013/0241559 A1    Sep. 19, 2013

(51) Int. Cl.
*G01V 3/00*    (2006.01)

(52) U.S. Cl.
USPC .......................................................... 324/334

(58) Field of Classification Search
USPC ......... 324/332, 334, 337, 345, 347, 348, 350, 324/357, 365
See application file for complete search history.

(56) References Cited

U.S. PATENT DOCUMENTS

| | | | |
|---|---|---|---|
| 4,353,071 A * | 10/1982 | Bernstein et al. | 343/709 |
| 4,617,518 A | 10/1986 | Srnka | |
| 7,529,627 B2 * | 5/2009 | Lisitsyn et al. | 702/13 |
| 7,733,740 B2 | 6/2010 | Hillesund et al. | |
| 7,834,632 B2 | 11/2010 | Tenghamn et al. | |
| 2004/0000912 A1 * | 1/2004 | Conti et al. | 324/350 |
| 2006/0238200 A1 * | 10/2006 | Johnstad | 324/337 |
| 2008/0246485 A1 * | 10/2008 | Hibbs et al. | 324/332 |
| 2008/0309346 A1 * | 12/2008 | MacGregor et al. | 324/334 |
| 2009/0001986 A1 * | 1/2009 | Besson et al. | 324/335 |
| 2009/0184715 A1 * | 7/2009 | Summerfield et al. | 324/334 |
| 2009/0195251 A1 * | 8/2009 | Darnet et al. | 324/334 |
| 2009/0265111 A1 * | 10/2009 | Helwig et al. | 702/7 |
| 2009/0295394 A1 * | 12/2009 | Babour et al. | 324/350 |
| 2009/0315539 A1 * | 12/2009 | Helwig et al. | 324/149 |
| 2011/0291658 A1 | 12/2011 | Skogman et al. | |

OTHER PUBLICATIONS

Constable, "Marine EM Methods", Search and Discovery Article # 40175, Oct. 31, 2005.
Constable et al., "Special Section—Marine Controlled-Source Electromagnetic Methods", Geophysics, vol. 72, No. 2, Mar.-Apr. 2007.
"Electromagnetics—how good is it really?", Digital Energy Journal, Sep. 2010, pp. 14-15.

(Continued)

*Primary Examiner* — Melissa Koval
*Assistant Examiner* — Daniel Miller

(57) ABSTRACT

Disclosed is an electromagnetic receiver assembly for marine electromagnetic surveying, the electromagnetic receiver assembly comprising an elongated housing and receiver electrodes mounted at separate points along the elongated housing. An embodiment may include an electromagnetic receive assembly that includes an elongated housing, wherein the elongated housing defines an interior chamber. The electromagnetic receiver assembly may further include receiver electrodes configured to be in contact with water when in operation, wherein the receiver electrodes are mounted at separate points along the elongated housing. The electromagnetic receiver assembly may further include sensor electronics disposed in the interior chamber and electrically coupled to the receiver electrodes. The electromagnetic receiver assembly may be configured for deployment on or near a bottom of a body of water.

28 Claims, 4 Drawing Sheets

(56) References Cited

OTHER PUBLICATIONS

Scripps Institution of Oceanography: Instruments / EM Receiver / Overview, Oct. 9, 2009, available at http://marineemlab/ucsd.edu/instruments/receiver.html.
EMGS—Receivers, printed from the Internet on Feb. 9, 2012, available at http://www.emgs.com/content/605/Recievers.
Peter Krylstedt, et al, "Numerical Modelling of Electromagnetic Frequency Sounding in Marine Environments: A Comparison of Local Optimisation Techniques," Marine Electromagnetic Conference (MARELEC) Conference Proceedings, Jun. 2001, Stockholm, Sweden.
Peter Krylstedt, et al, "A Sequential Approach to Inverse Modelling in Marine Electromagnetics: Recovering the Conductivity Profile from Measurements of the Electromagnetic Field," Marine Electromagnetic Conference (MARELEC) Conference Proceedings, Jun. 2001, Stockholm, Sweden.

* cited by examiner

ELECTROMAGNETIC RECEIVER ASSEMBLY FOR MARINE ELECTROMAGNETIC SURVEYING

BACKGROUND

The present invention relates generally to marine electromagnetic surveying. More particularly, in one or more embodiments, this invention relates to an electromagnetic receiver assembly for marine electromagnetic surveying, the electromagnetic receiver assembly comprising an elongated housing and receiver electrodes mounted at separate points along the elongated housing, and methods of use thereof.

Marine electromagnetic (EM) surveying is a geophysical surveying technique that uses EM energy to identify possible hydrocarbon-bearing rock formations below the bottom of a body of water, such as a lake or ocean. In some instances, an EM source is towed through the water over an area of interest in the Earth's subsurface. The EM source can emit an energy field into the body of water that interacts with the rock formations below the water bottom. Without limitation, a number of EM receiver assemblies positioned on or near the water bottom detect changes in the energy field due to the interaction with the rock formation and generate response signals that can be used to infer certain properties of the subsurface rock, such as structure, mineral composition and fluid content, thereby providing information useful in the recovery of hydrocarbons.

In conventional systems, the EM receiver assemblies may comprise a number of components, including a main body and EM sensors. The main body is typically a cube-like structure to which sensor electronics and an acoustic location system may be mounted. A ballast material (e.g., a concrete block) for deployment of the assembly onto the water bottom and a buoyant material for flotation may also be mounted to the main body. The EM sensors can include, for example, two, four, or more receiver electrodes mounted in the ends of long arms that can be attached to the main body. Drawbacks to these conventional EM receiver assemblies include the handling and logistics associated with deployment of the assemblies from a survey vessel. For example, due to space constraints associated with storing the EM receiver assemblies on the survey vessel, the EM survey systems may be limited to deployment of around 50 EM receiver assemblies. By way of further example, the arms as well as the ballast material are typically attached to the main body on the survey vessel when preparing for deployment, thus adding additional time and complexity to their deployment. With the ballast material attached, the bulky nature of the EM receiver assemblies adds to the difficulty in deploying them from the survey vessel. Recovery of the EM receiver assemblies after use may also be problematic as the equipment needed for recovery of the cube-like structure may add complexity to the EM survey system.

Accordingly, there is a need for improved receiver assemblies for marine EM surveying that can be more easily deployed and recovered than conventional receiver assemblies that have been used heretofore.

BRIEF DESCRIPTION OF THE DRAWINGS

These drawings illustrate certain aspects of some of the embodiments of the present invention and should not be used to limit or define the invention.

DETAILED DESCRIPTION

Embodiments of the present invention provide an electromagnetic receiver assembly for marine electromagnetic surveying, the EM receiver assembly comprising an elongated housing and receiver electrodes mounted at separate points along the elongated housing. One of the many potential advantages of the systems and methods of the present invention, only some of which are disclosed herein, is that the EM receiver assemblies may have improved handling and logistics especially when compared to conventional receiver assemblies with a cube-like base. For example, the elongated housing may facilitate deployment as a single person or an air gun may be used to deploy an EM receiver assembly from the survey vessel, especially for embodiments in which the elongated housing is generally tubally shaped. Recovery of the EM receiver assemblies may also be improved in accordance with embodiments of the present invention as a surface net supported by an arm structure may be extended from the survey or vessel may be used for collection of the assemblies from the water, for example. By way of further example, the EM receiver assemblies may utilize less deck space onboard survey vessels as large quantities of the EM receiver assemblies can be stored in a single container, which can be prepared onshore and then loaded onto the survey vessel. Accordingly, the amount of EM receiver assemblies available for use in a marine EM survey system may be increased in accordance with embodiments of the present invention. For example, 500 or more EM receiver assemblies may be stored and handled on the deck of the survey vessel.

Figure 1:
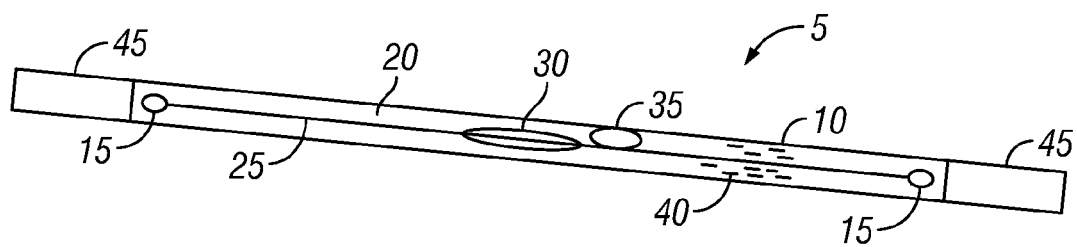
FIG. 1 is a schematic view of an EM receiver assembly in accordance with embodiments of the present invention.

FIG. 1 illustrates an EM receiver assembly 5 in accordance with embodiments of the present invention. In the illustrated embodiment, the EM receiver assembly 5 comprises an elongated housing 10 and a pair of receiver electrodes 15 mounted in the elongated housing 10. Without limitation, the elongated housing 10 may be made, for example, from a rigid, high strength, high density plastic or another rigid, high strength material suitable for subsea deployment. In one embodiment, the elongated housing 10 may have a surface that is made from an electrically non-conducting material. In some embodiments, the elongated housing 10 can be generally tubal in shape. For example, the elongated housing 10 may be a cylinder with circular cross-section, or the cross-section may be triangular, square, pentagonal, hexagonal, etc. Without limitation, the EM receiver assembly 5 having a generally tubal shape may be rolled off a survey vessel for deployment. As illustrated, the elongated housing 10 may define a longitudinally oriented interior chamber 20 that extends along the length of the elongated housing 10 and may be closed at both ends, for example. The elongated housing 10 may have a length, for example, of about 4 meters to about 25 meters, about 5 meters to about 20 meters, or about 6 to about 18 meters. In some embodiments, the elongated housing 10 may have a length of about 6 meters, 12 meters, or 18 meters. The elongated housing 10 may have a diameter, for example of about 5 centimeters to about 50 centimeters or about 10 centimeters to about 20 centimeters. In one embodiment, the elongated housing 10 may have a diameter of about 15 centimeters.

As illustrated, one of the receiver electrodes 15 may be mounted in each end of the elongated housing 10. The receiver electrodes 15 may have a horizontal separation, for example, of about 4 meters to about 25 meters, about 5 meters to about 20 meters, or about 6 to about 18 meters. As would be understood by one of ordinary skill in the art with the benefit of this disclosure, a greater separation between the electrodes may enhance the ability to detect electric field data; thus location of the receiver electrodes 15 at or near each end of elongated housing 10 may be most efficient. However, some embodiments might include receiver electrodes 15 mounted at separate points along housing 10 other than at or near each end thereof. The receiver electrodes 15 may be configured to be in contact with water when the EM receiver assembly 5 is deployed in a body of water. Without limitation, the receiver electrodes 15 can be configured to detect changes in an energy field due to the interaction with a subsurface rock formation, such as one or more parameters related to the energy field (e.g., voltage). The receiver electrodes 15 may be any of a variety of electrodes suitable for use in marine EM surveying, including, for example, silver-silver chloride electrodes. The receiver electrodes 15 may be electrically connected by electrical conductors 25 extending between the receiver electrodes 15 in the interior chamber 20 of the elongated housing 10.

Embodiments of the EM receiver assembly 5 may further include sensor electronics 30 disposed in interior chamber 20 within the elongated housing 10. The sensor electronics 30 may include a wide variety of devices (none shown separately) for operating the EM receiver assembly 5. The sensor electronics 30 may include, for example, electronics for sampling and logging the electronic field data sensed by the receiver electrodes 15. For example, the sensor electronics 30 may include electronic memory and/or a signal processor. Additionally, the sensor electronics 30 further may include a magnetometer, a tilt sensor, and/or a battery. As illustrated, the electrical conductors 25 may electrically connect the sensor electronics 30 with the receiver electrodes 15. To conserve battery life, the sensor electronics 30 may be turned on at deployment or in the water, for example.

Embodiments of the EM receiver assembly 5 may further include an acoustic location system 35 disposed in interior chamber 20 within the elongated housing 10. The acoustic location system 35 may include any of a variety of devices (none shown separately) for generating acoustic signals that can be used to determine the location of the EM receiver assembly 5. The acoustic location system 35 may include, for example, an acoustic responder and/or a compass. As illustrated, the electrical conductors 25 may electrically connect the acoustic location system 35 with the sensor electronics 30.

Embodiments of the EM receiver assembly 5 may further include a buoyant material 40 disposed in the interior chamber 20 of the elongated housing 10. In one embodiment, the buoyant material 40 may substantially fill the interior chamber 20. Without limitation, the buoyant material 40 should add buoyancy so that the EM receiver assembly 5 can float to the surface for recovery when surveying is complete. Additionally, the buoyant material 40 may also exclude fluid (e.g., water) from the interior chamber 20 and/or electrically insulate the various components inside the elongated housing 10. A wide variety of materials can be used as the buoyant material 40, including a curable, synthetic urethane-based polymer or other gel-like substance that can be used to fill the interior chamber 20. Additional materials that may be used for the buoyant material 40 include, without limitation, glass spheres, which may be mixed in an epoxy resin, for example.

Figure 3:
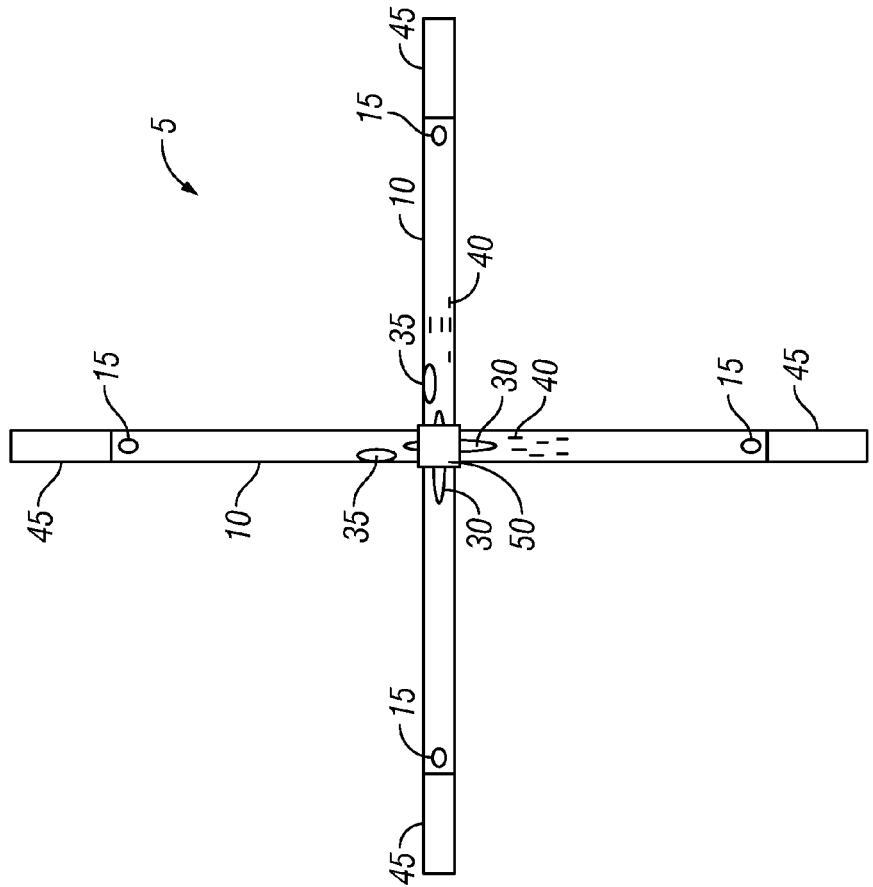
FIGS. 2 and 3 are schematic views of an EM receiver assembly comprising a pair of elongated housings that are rotatably coupled in accordance with embodiments of the present invention.
Figure 2:
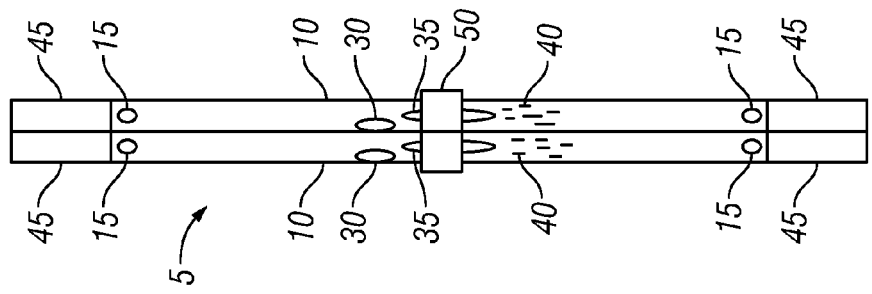

Embodiments of the EM receiver assembly 5 may further include a ballast material 45 coupled to the elongated housing 10. As illustrated, the ballast material 45 may be coupled to either end of the elongated housing 10 in accordance with present embodiments. Without limitation, the ballast material 45 should weight the EM receiver assembly 5 for deployment on or near the water bottom. In one embodiment, the EM receiver assembly 5 may be pre-assembled with the ballast material 45 coupled to the elongated housing 10 prior to loading onto the survey vessel. In another embodiment, the ballast material 45 may coupled to the elongated housing 10 at launch from the survey vessel. The ballast material 45 may be configured to be remotely detached from the elongated housing 10 while deployed in the body of water. For example, a signal may be sent to the EM receiver assembly 5 that causes the ballast material 45 to detach from the elongated housing 10 after deployment in the water. In one embodiment, signal may cause a wire (not illustrated) securing the ballast material 45 to the elongated housing 10 to burn off thus detaching the ballast material 45 from the elongated housing 10. Without limitation, detachment of the ballast material 45 should facilitate recovery of the EM receiver 5 assembly as the EM receiver assembly 5 should then readily float to the surface for recovery and data extraction. While the ballast material 45 is illustrated as being approximately equivalent in width as the elongated housing 10, it should be understood that the ballast material 45 may be wider or narrower as the elongated housing 10 as desired for a particular application. Examples of suitable materials that may be used as the ballast material 45 include concrete and steel, among others. In one embodiment, the ballast material 45 may be configured as concrete blocks that are disposed at either end of the elongated housing 10. The concrete blocks may be reinforced with water-soluble plastics in a manner that will be apparent to those of ordinary skill in the art. In some embodiments, the cement may be degradable cement that is configured to degrade in the water. For convenience, the illustrations and descriptions herein are confined to embodiments wherein the EM receiver assembly 5 is configured to be in direct contact with the bottom of the body of water. One of ordinary skill in the art with the benefit of this disclosure would understand that other embodiments are possible wherein the EM receiver assembly 5 is configured to be located near the bottom of the body of water, for example, on a coral reef or other natural structure, on a platform or other manmade structure, suspended from a tether line connected to a buoyancy device and/or attached to an anchor line, etc., FIGS. 2 and 3 illustrate an EM receiver assembly 5 comprising a pair of elongated housings 10 that are rotatably coupled by rotation assembly 50 in accordance with alternative embodiments of the present invention. In the illustrated embodiment, the pair of elongated housings 10 each may comprise receiver electrodes 15 on either end of the elongated housing 10. As illustrated, sensor electronics 30, acoustic location system 35, and buoyant material 40 may be disposed in each elongated housing 10 with ballast material 45 coupled to either end of each elongated housing 10, for example. The elongated housings 10 may be rotated to a folded position in which the elongated housings 10 are generally parallel to one another, as best seen in FIG. 2. Without limitation, the folded position may facilitate efficient storage of the EM receiver assembly 5 when on the survey vessel. The EM receiver assembly 5 may be rotated to a deployed position in which the elongated housings 10 are generally perpendicular to one another, as best seen in FIG. 3. Without limitation, the EM receiver assembly 5 may be configured to form a two-dimensional EM-field cross sensor when in the deployed position as will be apparent to those of ordinary skill in the art.

As illustrated, the rotation assembly 50 may rotably couple the elongated housings 10 to one another. In one embodiment, the connection between the elongated housings 10 may be remotely released such that the elongated housings 10 are no longer attached. Without limitation, selectively releasing the elongated housings 10 from one another should facilitate recovery of each of the EM receiver assembly 5 after detachment of the ballast material 45. While not illustrated, the rotation assembly 50 may include a spring and a physical stop. The physical stop may, for example, hold the EM receiver assembly 5 in the folded position with the spring or other suitable mechanism biasing the EM receiver assembly 5 to the deployed position when the physical stop is released. However, it should be understood that the present invention should not be limited to any particular technique for placing the EM receiver assembly 5 into the deployed position.

Figure 4:
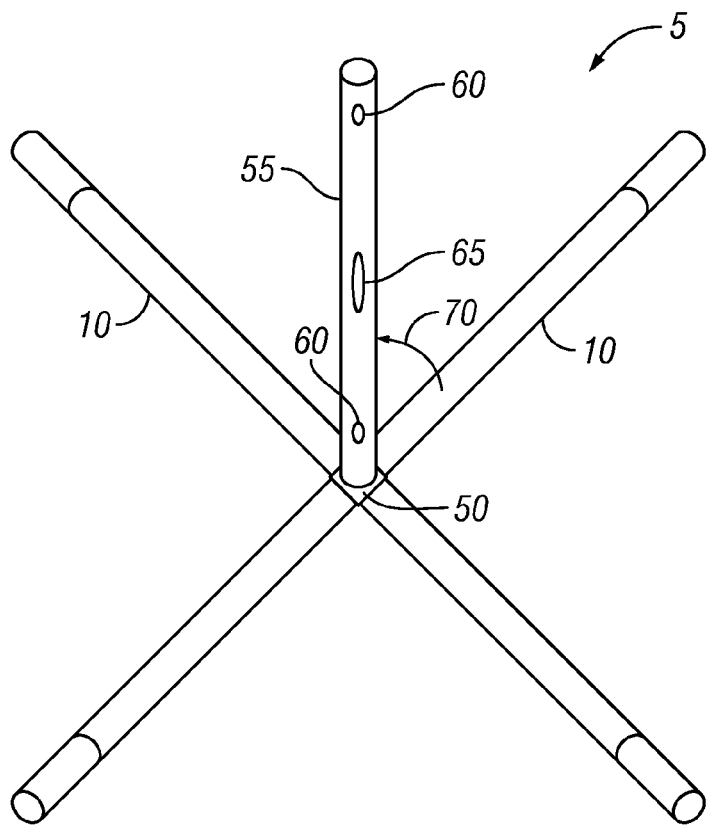
FIG. 4 is a schematic view of an EM receiver assembly comprising three elongated housings that are rotatably coupled in accordance with embodiments of the present invention.

FIG. 4 illustrates an EM receiver assembly 5 comprising a pair of elongated housings 10 that are rotatably coupled by rotation assembly 50 in accordance with alternative embodiments of the present invention. The EM receiver assembly 5 is similar to that illustrated on FIGS. 2-3 except that a third elongated housing 55 is rotably coupled to the pair of elongated housings 10. In the illustrated embodiment, the third elongated housing 55 includes receiver electrodes 60 in either end thereof. The third elongated housing 55 may also include sensor electronics 65. The third elongated housing 55 may be rotated up from the XY plane in a direction indicated by arrow 70 to a deployed position, for example, in which the third elongated housing 55 is generally orthogonal to the pair of elongated housings 10. Some embodiments may include a buoyancy bias device (not shown) on the third elongated housing 55 so that in its deployed position, third elongated housing 55 would be above (relative to the bottom of the body of water) the XY plane of the pair of elongated housings 10. Without limitation, the EM receiver assembly 5 may be configured to form a three-dimensional EM-field cross sensor when in the deployed position as will be apparent to those of ordinary skill in the art. As illustrated, the rotation assembly 50 may rotatably couple the pair of elongated housings 5 and the third elongated housing 55 to one another. A physical stop (not illustrated) may be included in the rotation assembly for holding the third elongated housing 55 in a folded position with a spring (not illustrated) or other suitable mechanism, biasing the third elongated housing 55 to the deployed position when the stop is released. However, it should be understood that the present invention should not be limited to any particular technique for rotating the third elongated housing 55 to the deployed position.

Figure 5:
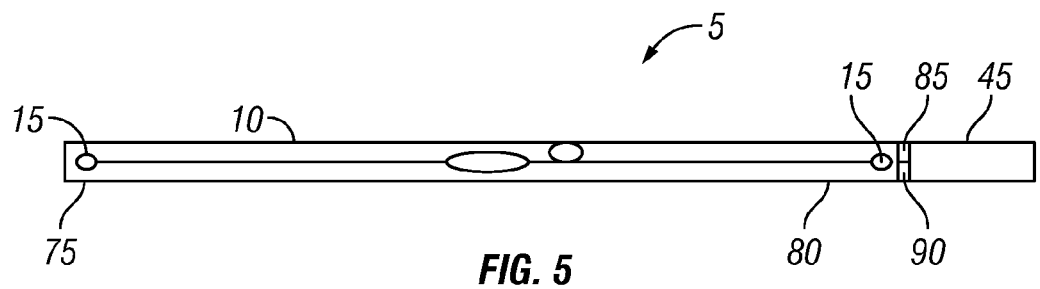
FIG. 5 is a schematic view of an EM receiver assembly in accordance with alternative embodiments of the present invention.

FIG. 5 illustrates an EM receiver assembly 5 in accordance with alternative embodiments of the present invention. In the illustrated embodiment, the EM receiver assembly 5 comprises an elongated housing 10 with receiver electrodes 15 in either end of the elongated housing 10. In the illustrated embodiment, the EM receiver assembly 5 may be configured with a first end 75 heavier than a second end 80 wherein the ballast material 45 is coupled to only the second end 80, rather than to both ends as described above with respect to FIGS. 1-4, for example. Without limitation, the second end 80, which is lighter, should float above the surface of the body of water after detachment of the ballast material 45, thus facilitating localization and recovery of the EM receiver assembly 5. In some embodiments, devices such as a radar reflector 85 and/or a light source 90 may be attached to the second end 60 for facilitating recovery of the EM receiver assembly.

Figure 6:
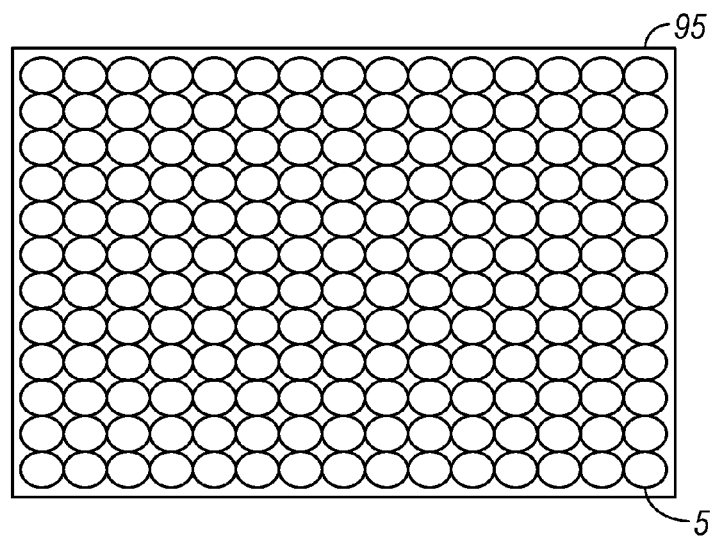
FIG. 6 is a schematic view of a container for holding EM receiver assemblies in accordance with embodiments of the present invention.

FIG. 6 illustrates a container 95 for holding EM receiver assemblies 5 in accordance with embodiments of the present invention. As illustrated, the EM receiver assemblies 5 may be loaded into the container 95 while onshore with the container 65 then being loaded onto the survey vessel. Without limitation, this arrangement for storing the EM receiver assemblies 5 can reduce the amount of deck space need on the survey vessel for the EM receiver assemblies 5, thus increasing the number of EM receiver assemblies 5 that can be deployed in a marine EM survey. In one embodiment, up to 50 or more EM receiver assemblies 5 may be stored in the container 95 depending on a number of factors, including the dimensions of the container 95 and the length and diameter of the EM receiver assemblies 5, for example. In some embodiments, the container 95 may be configured to hold at least 100, 200, 300, 400, or 500 EM receiver assemblies 5. The container 95 may have any suitable shape for holding the EM receiver assemblies 5 with the container 95 being in the general shape of a rectangular prism, in some embodiments.

Figure 7:
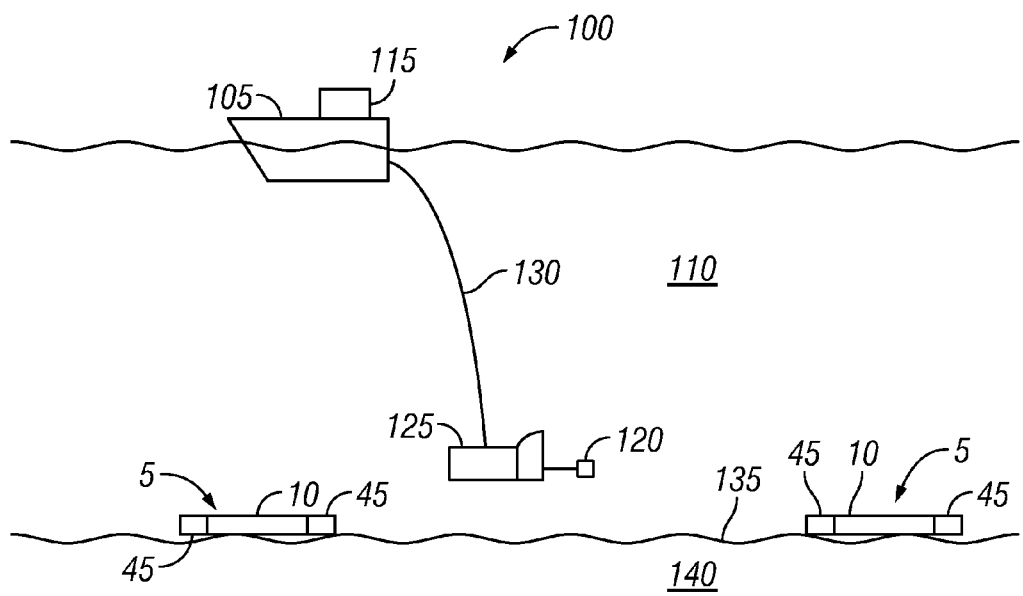
FIG. 7 is a schematic view of a geophysical survey system comprising EM receiver assemblies in accordance with embodiments of the present invention.

FIG. 7 illustrates a marine EM survey system 100 that includes EM receiver assemblies 5 in accordance with embodiments of the present invention. In the illustrated embodiment, the marine EM survey system 100 includes a survey vessel 105 that moves along the surface of the body of water 110. The survey vessel 105 generally may include equipment, shown generally at 115 and collectively referred to herein as "survey equipment." The survey equipment 115 may include devices (none shown separately) for determining geodetic position of the vessel 105 (e.g., a global positioning system satellite receiver signal) and actuating an energy source 120 (explained further below) at selected times, among others. A submersible vehicle 125 carrying the energy source 120 may be attached to the survey vessel 105 by cable 130. Some embodiments may also include a towed energy source 120 without the assistance of a submersible vehicle 125, while other embodiments may include a submersible vehicle 125 which acts as a remotely operated vehicle (ROV), without the use of cable 130. As illustrated, one or more EM receiver assemblies 5 may be located on the water bottom 135. Although the embodiment shown in FIG. 7 shows two EM receiver assemblies 5 and one energy source 120, it is to be understood that the number of devices is not a limitation on the scope of the invention. Other configurations may include more or fewer EM receiver assemblies 5 and energy sources 120. For example, embodiments may include deployment of a plurality of the EM receiver assemblies 5 on or near the water bottom 135 wherein the plurality of the EM receiver assemblies 5 are configured the same.

In operation, the EM source 120 may emit an energy field into the body of water 110 that interacts with rock formations 140 below the water bottom 135. Without limitation, the EM receiver assemblies 5 may detect changes in the energy field due to the interaction with the rock formations 140 and generate response signals which are then recorded for later analysis. When the electromagnetic survey is complete or at another desired time, the ballast material 45 may be detached from elongated housing 10 of each of the EM receiver assemblies 5 so that the EM receiver assemblies 5 can float to the surface of the body of water 110 for recovery. After recovery, the data stored in each of the EM receiver assemblies 5 can be analyzed to infer certain properties of the rock formations 140.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range are specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted for the purposes of understanding this invention.

What is claimed is:

1. An electromagnetic receiver assembly, comprising:
   a first elongated housing, wherein the first elongated housing defines an interior chamber;
   receiver electrodes configured to be in contact with water when in operation, wherein the receiver electrodes are mounted at separate points along the first elongated housing;
   sensor electronics disposed in the interior chamber of the first elongated housing and electrically coupled to the receiver electrodes;
   a second elongated housing rotatably coupled to the first elongated housing, wherein the second elongated housing defines an interior chamber;
   additional receiver electrodes configured to be in contact with water when in operation, wherein the additional receiver electrodes are mounted at separate points along the second elongated housing;
   wherein the electromagnetic receiver assembly is configured for deployment on or near a bottom of a body of water.

2. The electromagnetic receiver assembly of claim 1, wherein the receiver electrodes are disposed at or near either end of the first elongated housing.

3. The electromagnetic receiver assembly of claim 1, wherein at least one of the first elongated housing or the second elongated housing is generally tubal in shape.

4. The electromagnetic receiver assembly of claim 1, wherein a cross section of at least one of the first elongated housing or the second elongated housing is a circle.

5. The electromagnetic receiver assembly of claim 4, wherein at least one of the first elongated housing or the second elongated housing has a length of about 4 meters to about 25 meters, and a diameter of the circular cross section of about 5 centimeters to about 50 centimeters.

6. The electromagnetic receiver assembly of claim 1, wherein the sensor electronics comprise at least one device selected from the group consisting of: a signal processor, electronic memory, a tilt sensor, a magnetometer, a compass, an acoustic responder, and a battery.

7. The electromagnetic receiver assembly of claim 1, further comprising an acoustic location system disposed in the interior chamber of the first elongated housing or the interior chamber of the second elongated housing.

8. The electromagnetic receiver assembly of claim 1, further comprising a buoyant material disposed in the interior chamber of the first elongated housing or the interior chamber of the second elongated housing.

9. The electromagnetic receiver assembly of claim 1, further comprising a ballast material coupled to at least one end of the first elongated housing.

10. The electromagnetic receiver assembly of claim 9, wherein the ballast material is configured to be remotely detached from the first elongated housing while deployed in the body of water.

11. The electromagnetic receiver assembly of claim 1, further comprising a ballast material comprising concrete coupled to either end of the first elongated housing.

12. The electromagnetic receiver assembly of claim 1, further comprising a third elongated housing rotatably coupled to the first elongated housing and the second elongated housing, wherein at least one additional receiver electrode is disposed in either end of the third elongated housing, and wherein the third elongated housing is configured to rotate up from the first elongated housing and the second elongated housing.

13. The electromagnetic receiver assembly of claim 1, wherein the first elongated housing and the second elongated housing are configured to be positioned in a folded position with the first elongated housing and the second elongated housing being generally parallel to one another, and wherein the first elongated housing and the second elongated housing are configured to be positioned in a deployed position with the first elongated housing and the second elongated housing being generally perpendicular to one another.

14. The electromagnetic receiver assembly of claim 1, wherein a first end of the first elongated housing is heavier than a second end of the second elongated housing.

15. The electromagnetic receiver assembly of claim 1, wherein the first elongated housing and the second elongated housing are configured to be remotely released from one another such that the first elongated housing the second elongated housing are no longer attached.

16. A marine electromagnetic survey method, comprising:
   deploying a first electromagnetic receiver assembly at or near a bottom of a body of water, wherein the first electromagnetic receiver assembly comprises:
   a first elongated housing, wherein the first elongated housing defines an interior chamber;
   receiver electrodes, wherein the receiver electrodes are mounted at separate points along the first elongated housing;
   sensor electronics disposed in the interior chamber of the first elongated housing and electrically coupled to the receiver electrodes;
   a second elongated housing rotatably coupled to the first elongated housing, wherein the second elongated housing defines an interior chamber,
   additional receiver electrodes configured to be in contact with water when in operation, wherein the additional receiver electrodes are mounted at separate points along the second elongated housing;

transmitting an energy field into the body of water; and sensing a parameter related to the energy field with the receiver electrodes.

17. The marine electromagnetic survey method of claim 16, wherein the receiver electrodes are located at or near either end of the first elongated housing.

18. The marine electromagnetic survey method of claim 16, wherein deploying the first electromagnetic receiver assembly comprises rolling the first electromagnetic receiver assembly from a survey vessel.

19. The marine electromagnetic survey method of claim 16, further comprising remotely detaching ballast material from the first elongated housing.

20. The marine electromagnetic survey method of claim 16, further comprising generating a signal from the first electromagnetic receiver assembly for determining location of the first electromagnetic receiver assembly.

21. The marine electromagnetic survey method of claim 16, wherein the deploying further comprises rotating the first elongated housing with respect to the second elongated housing such that the first elongated housing and the second elongated housing are generally perpendicular with respect to one another.

22. The marine electromagnetic survey method of claim 16, further comprising storing the first electromagnetic receiver assembly in a container on a survey vessel, the container holding a plurality of electromagnetic receiver assemblies.

23. The marine electromagnetic survey method of claim 16, further comprising repeating the deploying step for a plurality of electromagnetic receiver assemblies, wherein each of the plurality of electromagnetic receiver assemblies is configured the same as the first electromagnetic receiver assembly.

24. The marine electromagnetic survey method of claim 21, wherein the step of rotating is performed remotely.

25. An electromagnetic survey system, comprising:
an electromagnetic source configured to emit an energy field into a body of water;
an electromagnetic receiver assembly configured for deployment on or near a bottom of the body of water, wherein the electromagnetic receiver assembly comprises:
a first elongated housing, wherein the first elongated housing defines an interior chamber;
receiver electrodes configured to sense a parameter related to the energy field, wherein the receiver electrodes are mounted at separate points along the first elongated housing;
sensor electronics disposed in the interior chamber of the first elongated housing and electrically coupled to the receiver electrodes;
a second elongated housing rotatably coupled to the first elongated housing, wherein the second elongated housing defines an interior chamber,
additional receiver electrodes configured to be in contact with water when in operation, wherein the additional receiver electrodes are mounted at separate points along the second elongated housing.

26. The electromagnetic survey system of claim 25, wherein the receiver electrodes are disposed at or near either end of the first elongated housing.

27. The electromagnetic survey system of claim 25, further comprising a ballast material coupled to at least one end of the first elongated housing, wherein the ballast material is configured to be remotely detached from the first elongated housing while deployed in the body of water.

28. The electromagnetic survey system of claim 25, further comprising a location system disposed in the interior chamber of the first elongated housing or the interior chamber of the second elongated housing.

* * * * *